United States Patent
Halsey, IV et al.

(10) Patent No.: US 10,949,017 B1
(45) Date of Patent: Mar. 16, 2021

(54) PROJECTED CAPACITIVE TO SURFACE CAPACITIVE INTERFACE

(71) Applicant: TES America, LLC, Holland, MI (US)

(72) Inventors: Eugene L Halsey, IV, Holland, MI (US); Steven Mainville, Holland, MI (US)

(73) Assignee: TES America, LLC, Holland, MI (US)

( * ) Notice: Subject to any disclaimer, the term of this patent is extended or adjusted under 35 U.S.C. 154(b) by 0 days.

(21) Appl. No.: 17/110,336

(22) Filed: Dec. 3, 2020

(51) Int. Cl.
*G06F 3/041* (2006.01)
*G06F 3/044* (2006.01)

(52) U.S. Cl.
CPC .......... *G06F 3/0416* (2013.01); *G06F 3/0445* (2019.05)

(58) Field of Classification Search
CPC ........ G06F 3/044; G06F 3/0445; G06F 3/045; G06F 3/0416
See application file for complete search history.

(56) References Cited

U.S. PATENT DOCUMENTS

| 2004/0183787 A1* | 9/2004 | Geaghan | G06F 3/0445 345/173 |
| 2016/0282991 A1* | 9/2016 | Wu | G06F 3/041662 |
| 2019/0102040 A1* | 4/2019 | Lu | G06F 3/04166 |

\* cited by examiner

*Primary Examiner* — Liliana Cerullo
(74) *Attorney, Agent, or Firm* — Bayramoglu Law Offices LLC

(57) ABSTRACT

A projected capacitive to surface capacitive interface comprises a projected capacitive touch controller connected to a projected capacitive touch sensor either with a chip on flex circuit or with a discrete chip on board controller, a connector wire, which coordinates the interface between the projected capacitive touch controller and an emulation board, a surface capacitive touch controller and a connector connecting the surface capacitive touch controller to a host computer. The interface communicates with the microcontroller that converts a calculated touch position to resistance values that are then sent to the surface capacitive touch controller as if the resistance values were measured values at four corners of a touch screen. The surface capacitive controller then is able to recalculate the calculated touch position using these resistance values and sends/reports a final touch position to the host computer.

20 Claims, 8 Drawing Sheets

PROJECTED CAPACITIVE TO SURFACE CAPACITIVE INTERFACE

TECHNICAL FIELD

The present disclosure relates to projected capacitive touch technology. More specifically, the present disclosure relates to an interface connection and function between projected capacitive touch technology and surface capacitive touch technology.

BACKGROUND

The current state of the art of surface capacitive technology (S-Cap) utilizes an electrically coated touch surface (usually with antimony-doped tin oxide) protected by a silicon dioxide overcoat, where the silicon dioxide overcoat is either dipped coated or sprayed sol-gel. A resistor network (R1-R4) is applied to the perimeter of a screen and is driven with a voltage source as shown in FIG. 1. When a user touches the screen, a small amount of current is drawn off to a ground through the individual's finger and the resulting ratio of current drops on each of the four corners of the screen determines a touch position as shown in FIG. 1. However, there are many challenges and problems associated with a surface capacitive system which include the silicon dioxide ($SiO_2$) overcoat/hardcoat is thin and can be worn off over time exposing an easily damaged antimony tin oxide (ATO) layer. Damage to the antimony tin oxide layer renders the screen useless in the damaged area. Another problem lies with the surface capacitive screen. The surface capacitive screens are very susceptible to noise interference from other electrically emitting devices that are in close proximity to the screen. This noise interference can cause significant misalignment in a reported touch location as compared to the actual touch location. While various methods used to mitigate this noise interference do exist, the manufacturer of the final system using the surface capacitive screen often has to resort to using large icons and buttons which lowers the usability and efficiency of the final solution and screen. An additional problem with the systems layer design is the sol-gel silicon dioxide (SiO2) hardcoats can typically be scratched with materials that have Mohs hardness (a Mohs scale of mineral hardness) of over 7. These corresponding scratches in the SiO2 layer damages the antimony tin oxide (ATO) layer located underneath the SiO2 layer and causes anomalies in the reported touch location in the area of the scratch. Moreover, wear and scratches in the system lead to premature replacement in the field which increases an end user's cost for their touch system.

To complicate matters, the replacement of the surface capacitive components and/or system in many applications is difficult as the industries that the technology is used in are heavily regulated and changes are expensive or impossible to perform. Thus, this leaves screen replacement as the only reasonable option for damaged surface capacitive systems.

The primary hurdle to replacing surface capacitive technology in existing systems is that the electronics that communicate back to a host computer are considered locked, that is the electronics cannot change. A touch sensor that the user interfaces with can change as evidenced by the replacement market for damaged screens. There are alternate technologies in the market that are more robust from a damage and noise immunity standpoint, but they cannot be easily implemented due to the electronics lock (i.e. the electronics cannot change) noted above.

Therefore, there is a significant need for easily, quickly, effectively and inexpensively being able to provide a solution to the above disclosed problems of the prior art while not having to change the existing electronics that communicate back to a host computer within the capacitive technology field.

A solution in the disclosure of this invention is to allow an alternate touch screen technology, in this case projected capacitive, to communicate with existing surface capacitive controller electronics and as such continue to report touch events back to a host computer without any change to those controller electronics.

SUMMARY

A projected capacitive system communicates with a new microcontroller that converts a calculated touch position to resistance values that are then sent to a surface capacitive controller as if the resistance values were measured values at four corners of a touch screen. The surface capacitive controller then is able to recalculate the calculated touch position using these resistance values and sends/reports a final touch position to a host computer as it would in a traditional surface capacitive system. In this case, locked electronics between a touch controller and the host computer that cannot be changed are left intact. However, what is changing is the apparatus and/or method of providing input data to the touch controller. Rather than current values from the four corners of a traditional surface capacitive sensor, input data is now the resistance values coming from the microcontroller that have been calculated based on the output of a projected capacitive touch system. Four resistor arrays are controlled by the microcontroller to provide the positionally equivalent resistance ratios to four S-cap controller inputs. Therefore, the new features disclosed in the novel invention includes converting touch coordinates from a projected capacitive touch sensor to signals, which either a surface capacitive or an analog resistive touch controller can process. This allows for industries that require no change to the core electronics that are communicating with a host computer to use projected capacitive technology if they are not already doing so.

The structure of this invention is remarkably simple in design, solves the above disclosed problems of the prior art and includes a projected capacitive touch sensor/structure, a projected capacitive touch controller attached to the projected capacitive touch sensor/structure either with a chip on flex (COF) circuit or with a discrete chip on board (COB) controller, a connector wire between the P-Cap touch controller and an emulation board, the emulation board comprises a microcontroller (i.e. the microcontroller may be located on or integrated into the emulation board), where the microcontroller converts calculated projected capacitive touch coordinates to resistance values and a pin (such as a five pin) connector wire is located between the emulation board and an existing surface capacitive controller.

When a surface capacitive touch sensor is damaged in the field or when a system operator wants to upgrade the physical durability of a surface capacitive sensor, the below disclosed projected capacitive replacement kit/system can be utilized. An existing S-Cap touch sensor is removed from the end user's machine, a replacement P-Cap touch sensor is mechanically installed into the machine. The emulation board and the P-Cap chip on board (COB) or chip on flex (COF) is then mounted into the end user's machine. Finally, the P-Cap sensor is connected to the emulation board and the emulation board is connected to the existing surface capacitive controller. The existing connection between the surface capacitive controller and host computer is left intact.

Voltage is applied to the projected capacitive touch controller and the emulation board and the voltage may come from a host computer or possibly from the surface capacitive controller.

In operation, the final function of the disclosed invention will be identical to what the end user experienced with the surface capacitive controller which is a single reported touch location as displayed on a Liquid Crystal Display (LCD) or a Cathode Ray Tube (CRT) such as a computer monitor, a television, a screen or other equivalent apparatus.

The invention may be applied to 5-wire analog resistive touch systems. In this case, the microcontroller on the emulation board would comprise a new setting of two output voltages, an X voltage and a Y voltage, as typically found in an analog resistive system. A resistive control board would then interpret the two output voltages and report a final touch position to the host computer. Again, in regulated or tightly controlled environments, such as in the medical environment, where resistive technology is prevalent, this P-Cap replacement kit/system would increase the durability of the end system while keeping the controlled electronics untouched.

There are many benefits to projected capacitive touch technology as compared to surface capacitive technology including:

1) Electrical coating layer (typically indium tin oxide) is located behind (i.e. underneath) a glass touch surface. Any surface damage to a surface layer does not damage the indium tin oxide (ITO) layer and therefore does not have a negative impact on the reported touch location.

2) Projected capacitive touch sensors are typically laminated constructions allowing for greater physical durability as compared to a monolithic surface capacitive construction.

3) Projected capacitive technology has become the de facto standard for the consumer electronics industry and common components are readily available.

4) Calibration is not needed.

Furthermore, there are a plurality of advantages of the invention over the prior existing technology. For example, the durability of the end solution such as the electrical coatings cannot be easily damaged, and the structure of the coatings is typically two pieces of laminated material giving greater physical durability. Also, the projected capacitive technology has longevity as by the de facto standard in consumer electronics, common components for P-Cap systems are readily available and as global volume for S-Cap and P-Cap manufacturing diminishes, replacement sensors become more difficult and more expensive to find. Moreover, this invention allows for a migration to state-of-the-art touch sensing while utilizing existing touch controller electronics that are tightly regulated in end use.

BRIEF DESCRIPTION OF THE DRAWINGS

In order to more clearly illustrate the embodiments of the present disclosure, a brief description of the drawings is given below. The following drawings are only illustrative of some of the embodiments of the present disclosure and for a person of ordinary skill in the art, other drawings or embodiments may be obtained from these drawings without inventive effort.

DETAILED DESCRIPTION

The technical solutions of the present disclosure will be clearly and completely described below with reference to the drawings. The embodiments described are only some of the embodiments of the present disclosure, rather than all of the embodiments. All other embodiments that are obtained by a person of ordinary skill in the art on the basis of the embodiments of the present disclosure without inventive effort shall be covered by the protective scope of the present disclosure.

In the description of the present disclosure, it is to be noted that the orientational or positional relation denoted by the terms such as "center", "upper", "lower", "left", "right", "vertical", "horizontal", "inner" and "outer" is based on the orientation or position relationship indicated by the figures, which only serves to facilitate describing the present disclosure and simplify the description, rather than indicating or suggesting that the device or element referred to must have a particular orientation, or is constructed or operated in a particular orientation, and therefore cannot be construed as a limitation on the present disclosure. In addition, the terms "first", "second" and "third" merely serve the purpose of description and should not be understood as an indication or implication of relative importance.

In the description of the present disclosure, it should be noted that unless otherwise explicitly specified and defined, the terms "install", "link" and "connect" shall be understood in the broadest sense, which may, for example, refer to fixed connection, detachable connection or integral connection; may refer to mechanical connection or electrical connection; may refer to direct connection or indirect connection by means of an intermediate medium; and may refer to communication between two elements. A person of ordinary skill in the art would understand the specific meaning of the terms in the present disclosure according to specific situations.

The present disclosure of a projected capacitive system is described in detail below in reference to the figures.

FIGS. 3-6 illustrate the present disclosure of a projected capacitive system communicating with a microcontroller that converts a calculated touch position to resistance values that are then sent to a surface capacitive controller as if the resistance values were measured values at four corners of a touch screen.

Figure 1:
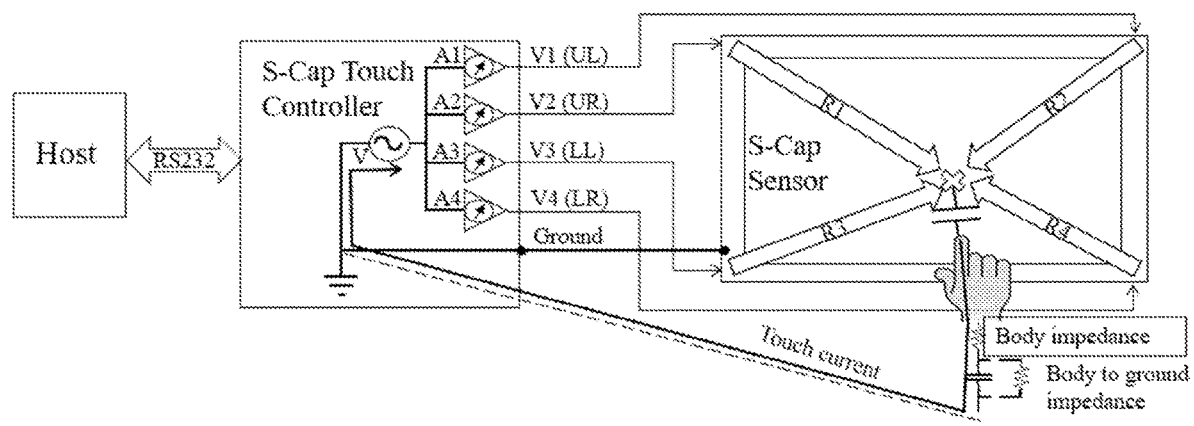
FIG. 1 is a schematic diagram of a prior art surface capacitive system.

FIG. 1 illustrates a prior art surface capacitive system. The surface capacitive (S-Cap) system comprises a host/host computer connected to a surface capacitive (S-Cap) touch controller via a connector such as RS232, a network of resistors (R1-R4) applied to the perimeter of a screen and is driven with a voltage source (V). The voltage source (V) is applied to a surface capacitive (S-Cap) sensor and a plurality of amplifiers (A1-A4) are connected to the voltage source (V). A ground is also connected to the screen. The amplifiers (A1-A4) measure current and gain from the corners of the surface capacitive (S-Cap) sensor. The resistors (R1-R4) exist between a user's finger and the four corners of the surface capacitive (S-Cap) sensor. Current is drawn from the touch screen, through the user/user's finger, to the ground and ratios of the current in each corner of the screen is used to calculate the position of a touch. Therefore, when a user touches the screen, a small amount of current is drawn off to the ground through an individual's finger and the resulting ratio of current drops on each of the four corners of the screen determines a touch position.

Figure 2:
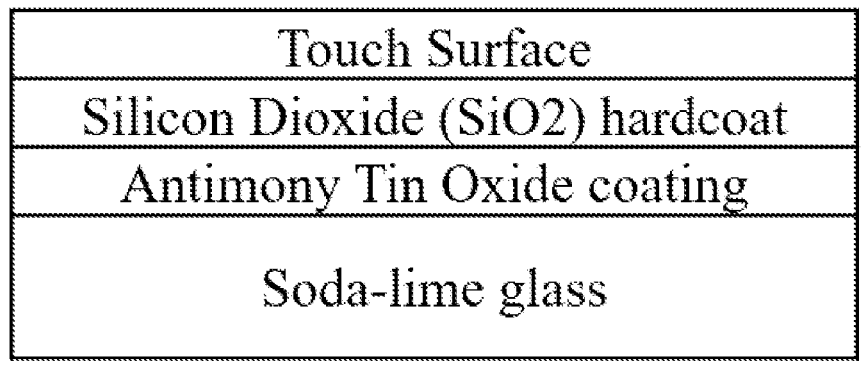
FIG. 2 is a schematic diagram of a prior art surface capacitive (S-Cap) structure/construction.

A prior art surface capacitive (S-Cap) structure/construction is shown in FIG. 2. The structure is comprised of a top touch surface, a silicon dioxide (SiO2) hardcoat layer underneath and adjacent the top touch surface, an antimony tin oxide (ATO) coating positioned underneath and adjacent the silicon dioxide (SiO2) hardcoat layer and a soda-lime glass layer positioned underneath and adjacent the antimony tin oxide (ATO) coating.

In general, the operation of the disclosed invention is an interface which emulates the circuit equivalent loading on a projected capacitive (P-Cap) sensor.

The structure of this invention is remarkably simple in design and solves the above stated problems of the prior art.

Figure 3:
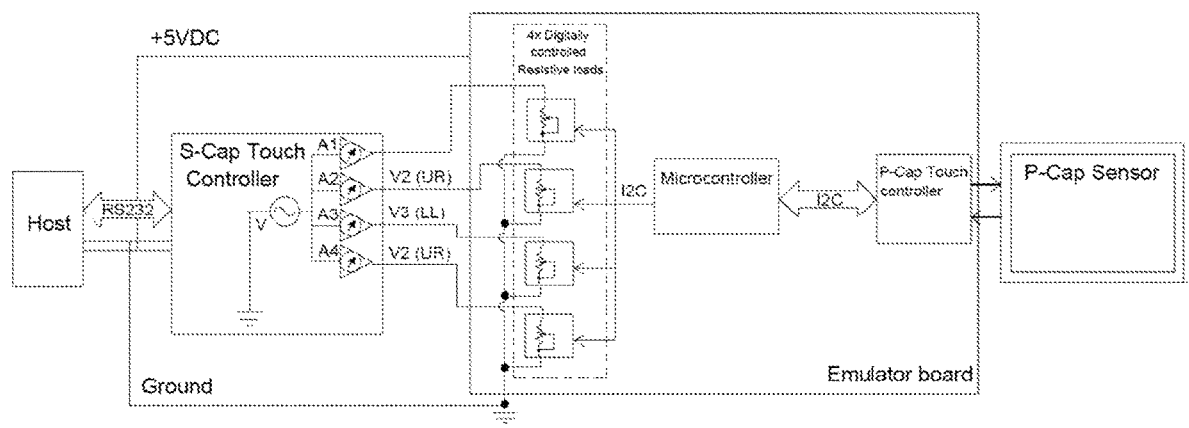
FIG. 3 is a schematic diagram of the disclosed invention illustrating a projected capacitive (P-Cap) system interfaced with a surface capacitive system.

As shown in FIG. 3, the projected capacitive (P-Cap) to surface capacitive (S-Cap) interface of this invention includes a projected capacitive touch controller connected/attached to a projected capacitive touch sensor/structure either with a chip on flex (COF) circuit or with a discrete chip on board (COB) controller, a connector wire, which may also include/connect to an Inter-Integrated Circuit (I2C)/Universal Serial Bus (USB) and coordinates the interface, between the P-Cap touch controller and an emulation board, a surface capacitive (S-Cap) touch controller, a host/host computer and a connector, such as RS232, connecting the surface capacitive (S-Cap) touch controller to the host/host computer.

The emulation board comprises a plurality of potentiometers and resistors, an equivalent interface circuit, a microcontroller (i.e. the microcontroller may be located on or integrated into the emulation board), where the microcontroller converts calculated projected capacitive touch coordinates to resistance values and a pin (such as a five pin) connector wire between the emulation board and a surface capacitive (S-Cap) touch controller. Therefore, the microcontroller converts touch coordinates to equivalent surface capacitive (S-Cap) resistances. A resistance value is controlled by each potentiometer. The potentiometers may be digital potentiometers. Four of the potentiometers are set to equivalent surface capacitive (S-Cap) resistances. The resistances are set by the microcontroller to emulate the ratios of the current for each corner of a surface capacitive (S-Cap) sensor.

Figure 8:
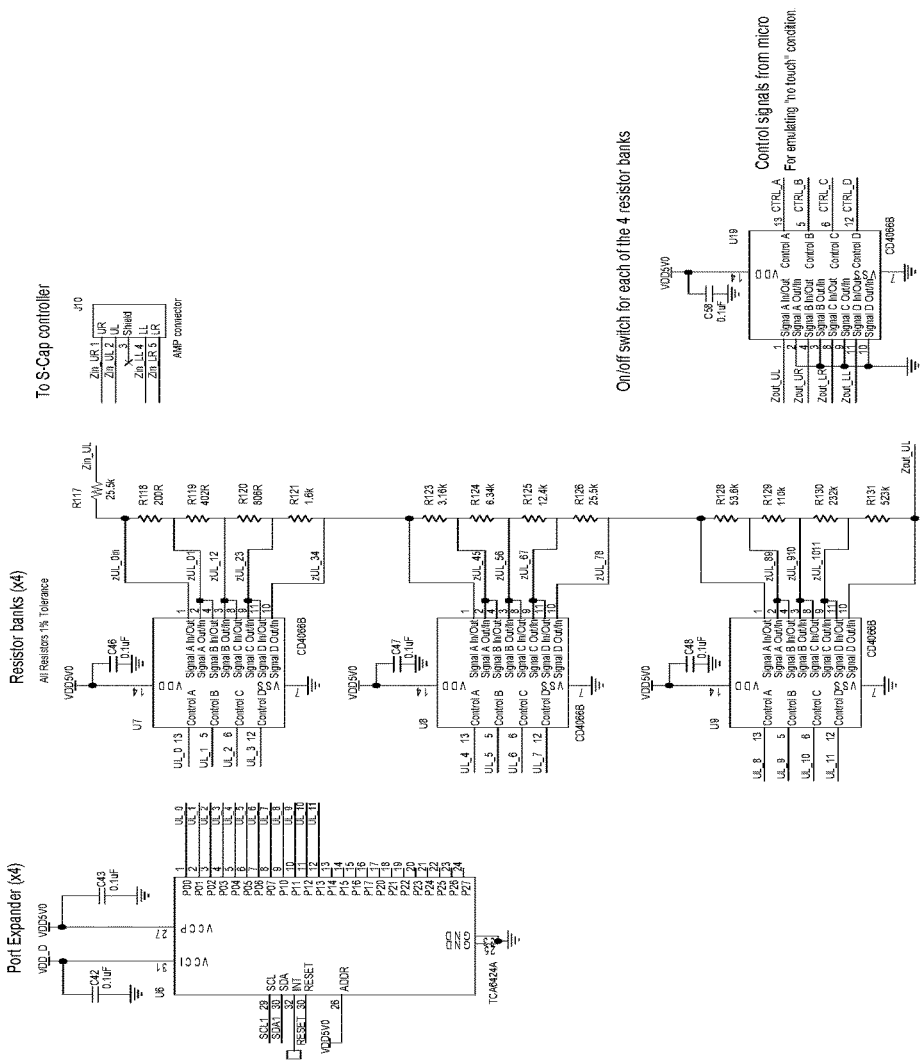
FIG. 8 is a schematic of a S-cap emulator load control circuit.

The microcontroller may set the resistance in two ways. One way is a digital potentiometer method where the microcontroller sets potentiometer values by the way of an Inter-Integrated Circuit (I2C). The second way is by the use of resistor banks, as shown in FIG. 8, where the use of micro GIPO's, general-purpose input/output (GPIO), to activate and/or deactivate resistors in series to emulate surface capacitive (S-Cap) loading.

Note that a general-purpose input/output (GPIO) is an uncommitted digital signal pin on an integrated circuit or electronic circuit board whose behavior, including whether it acts as input or output, is controllable by a user at run time.

The surface capacitive (S-Cap) touch controller includes a voltage source (V) and a plurality of amplifiers (A1-A4) being connected to the voltage source (V). A ground is also connected between the emulation board and the surface capacitive (S-Cap) touch controller. The ground on the emulation board is connected to the equivalent interface circuit of the emulation board, where the equivalent interface circuit is equivalent of a person touching a surface capacitive (S-Cap) sensor. Part of the equivalent interface circuit accounts for the body of the ground loading (i.e. touching the surface capacitive (S-Cap) sensor).

Voltage is applied to the projected capacitive touch controller and the emulation board and the voltage may come from the host computer or possibly from the surface capacitive touch controller.

The projected capacitive system (i.e. the projected capacitive (P-Cap) to surface capacitive (S-Cap) interface) communicates with the microcontroller that converts a calculated touch position to resistance values that are then sent to the surface capacitive (S-Cap) touch controller as if the resistance values were measured values at four corners of a touch screen. The surface capacitive controller then is able to recalculate the calculated touch position using these resistance values and sends/reports a final touch position to the host computer as it would in a traditional surface capacitive system. In this case, locked electronics between the surface capacitive (S-Cap) touch controller and the host computer that cannot be changed are left intact. However, what is changing is the method and/or manner of providing input data to the surface capacitive (S-Cap) touch controller. Rather than current values from the four corners of a traditional surface capacitive sensor, input data is now the resistance values coming from the microcontroller that have been calculated based on the output of a projected capacitive touch system. The array of four resistors (i.e. a resistor in each potentiometer as illustrated in FIG. 3) are controlled by the microcontroller to provide the positionally equivalent resistance ratios to four S-cap controller inputs. Therefore, the new features disclosed in the novel invention includes converting touch coordinates from a projected capacitive touch sensor to signals, which either a surface capacitive or an analog resistive touch controller can process. This allows for industries that require no change to the core electronics that are communicating with a host computer to use projected capacitive technology if they are not already doing so.

When a surface capacitive touch sensor is damaged in the field or when a system operator wants to upgrade the physical durability of a surface capacitive sensor, the below disclosed projected capacitive replacement kit/system can be utilized. An existing S-Cap touch sensor is removed from the end user's machine, a replacement P-Cap touch sensor is mechanically installed into the machine. The emulation board and the P-Cap chip on board (COB) or chip on flex (COF) is then mounted into the end user's machine. Finally, the P-Cap sensor is connected to the emulation board and the emulation board is connected to the existing surface capacitive controller. The existing connection between the surface capacitive controller and host computer is left intact.

Figure 4:
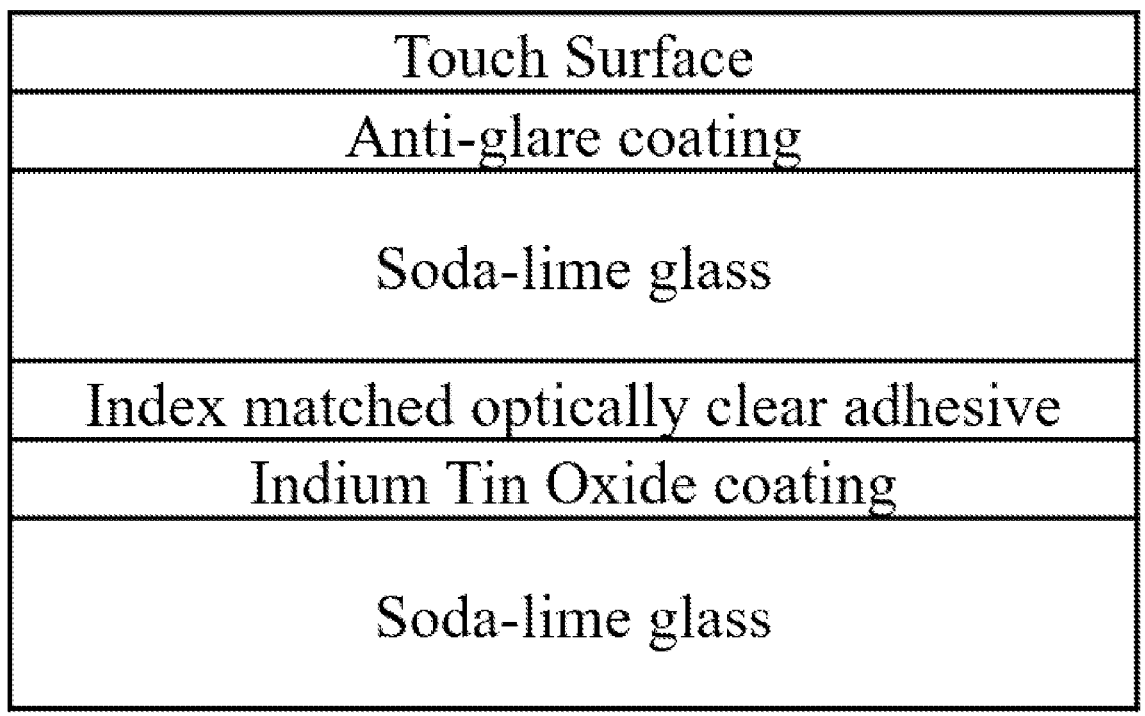
FIG. 4 is a schematic diagram of a projected capacitive (P-Cap) sensor/structure/construction using a single sided/layer Indium Tin Oxide (SITO) construction.

FIG. 4 illustrates a projected capacitive (P-Cap) sensor/structure/construction using a single sided/layer Indium Tin Oxide (SITO) construction. The projected capacitive (P-Cap) sensor/structure comprises a top touch surface such as a glass surface, an anti-glare coating positioned on the top touch surface, a (first) soda-lime glass layer positioned underneath and adjacent the anti-glare coating, an index matched optically clear adhesive positioned underneath and adjacent the (first) soda-lime glass layer, an indium tin oxide (ITO) coating positioned underneath and adjacent the index matched optically clear adhesive and a (second) soda-lime glass layer positioned underneath and adjacent the indium tin oxide (ITO) coating. The anti-glare coating can be a sprayed silica coating(s) or a chemically etched coating(s). The index matched optically clear adhesive can be Optically Clear Adhesive 8146-x, where x can be 1-5, which is a product from 3M™.

It is noted that an index matched material/adhesive is a substance, usually a liquid, cement (adhesive), or gel, which has an index of refraction that closely approximates that of another object/material/coating and when two materials/substances with the same index are in contact, light passes from one to the other with neither reflection nor refraction.

Figure 5:
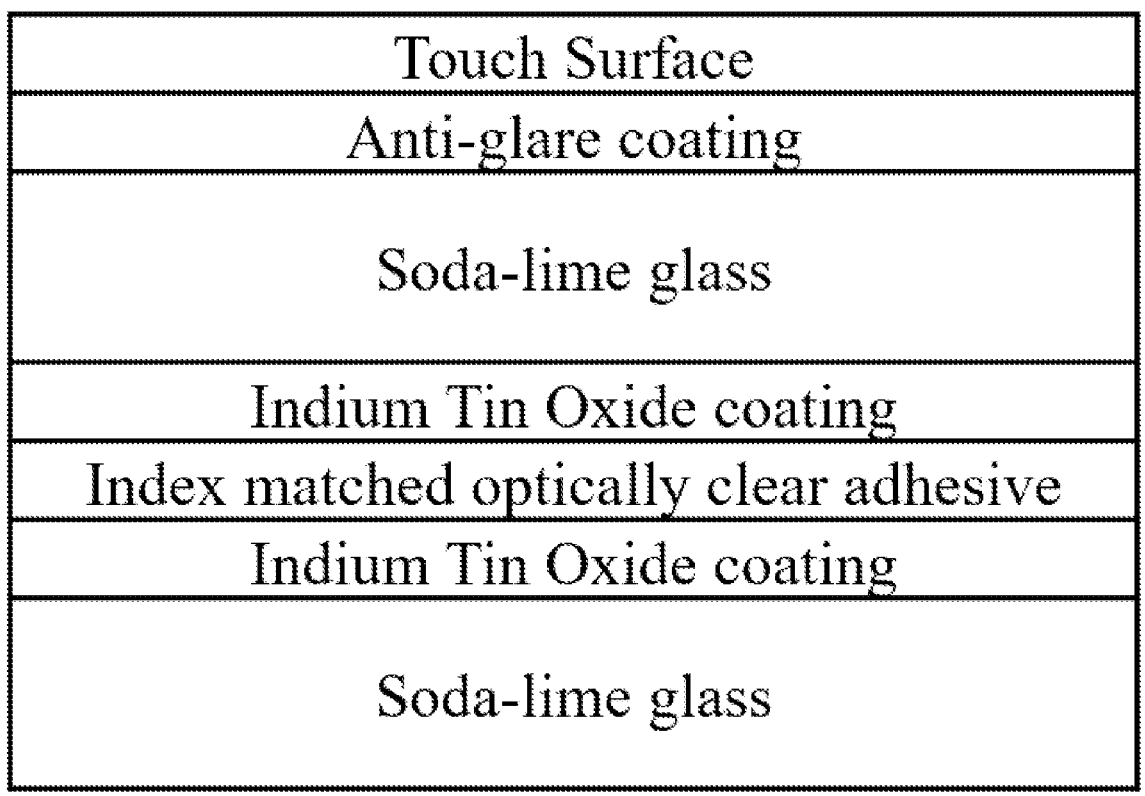
FIG. 5 is a schematic diagram of a projected capacitive (P-Cap) sensor/structure/construction using glass/glass construction.

FIG. 5 illustrates a projected capacitive (P-Cap) sensor/structure/construction using glass/glass construction. The projected capacitive (P-Cap) sensor/structure comprises a top touch surface such as a glass surface, an anti-glare coating positioned underneath and adjacent the top touch surface, a (first) soda-lime glass layer positioned underneath and adjacent the anti-glare coating, a (first) indium tin oxide (ITO) coating positioned underneath and adjacent the (first) soda-lime glass layer, an index matched optically clear adhesive positioned underneath and adjacent the (first) indium tin oxide (ITO) coating, a (second) indium tin oxide (ITO) coating positioned underneath and adjacent the index matched optically clear adhesive and a (second) soda-lime glass layer positioned underneath and adjacent the (second) indium tin oxide (ITO) coating.

Figure 6:
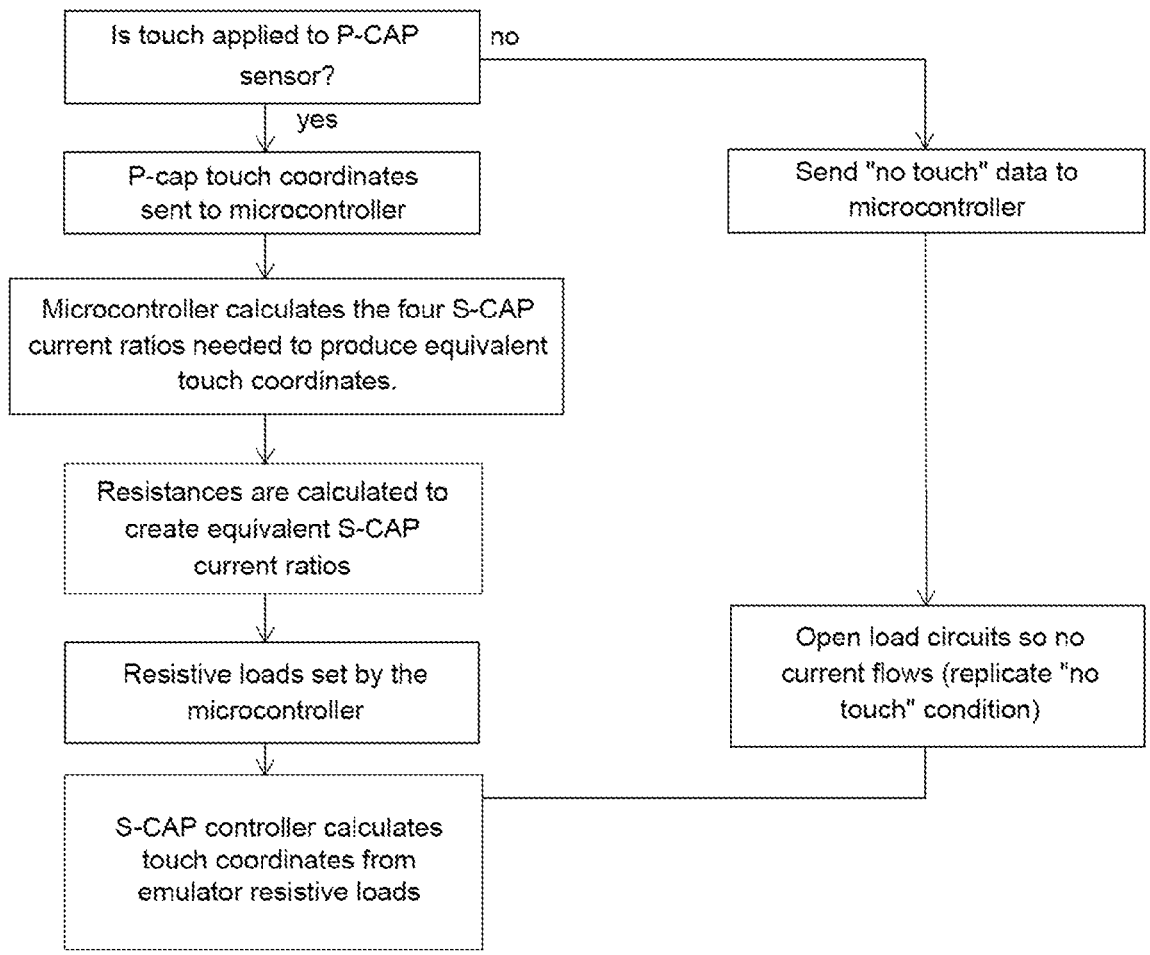
FIG. 6 is a flow chart which illustrates and discloses the operation of the invention when a touch is and is not applied to a P-CAP sensor.

FIG. 6 is a flow chart of the invention. More specifically, FIG. 6 shows the operation of the invention when a touch is and is not applied to a P-CAP sensor. When no touch is applied to a P-CAP sensor, then no touch data is sent to the microcontroller and no current flows to the circuits such as to replicate a no touch condition. When a touch is applied to a P-CAP sensor, P-CAP touch coordinates are sent to the microcontroller, then the microcontroller calculates four S-CAP current ratios needed to produce equivalent touch coordinates. Then, resistances are calculated to create equivalent S-CAP current ratios and then resistive loads are set by the controller and then the S-CAP controller calculates touch coordinates from emulator resistive loads.

Figure 7:
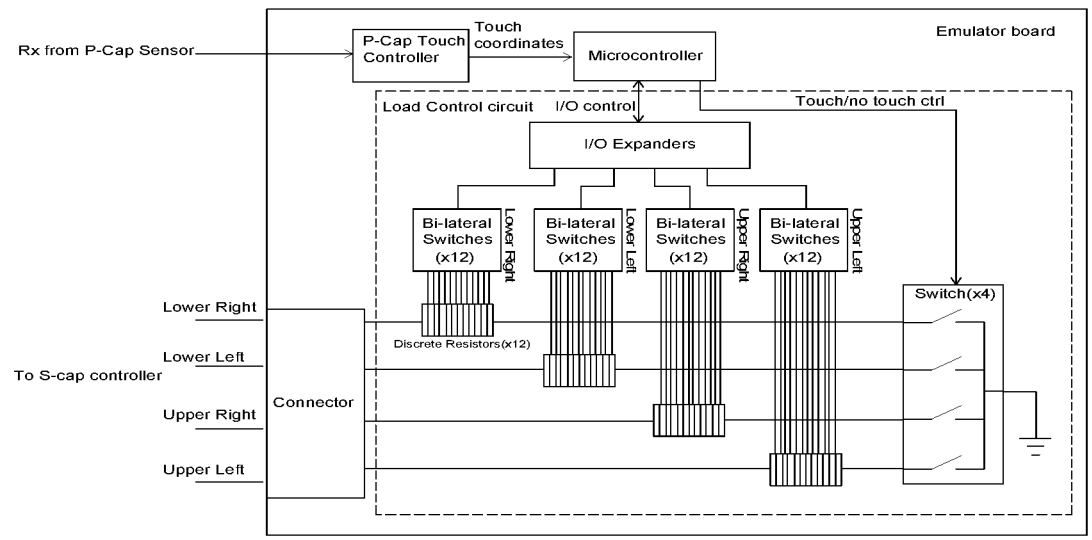
FIG. 7 is a block diagram of a S-cap emulator circuit.

FIG. 7 is a block diagram of a S-cap emulator circuit. The dotted line shown in FIG. 7 depicts a load control circuitry. FIG. 7 illustrates the P-Cap Touch Controller in communication/connection with the microcontroller; the microcontroller in communication/connection with expanders; the expanders in communication/connection with a plurality of switches such as bi-lateral switches; each of the switches is in communication/connection with at least one resistor such as a discrete resistor; each of the at least one resistor is in communication with a connector and a switch that is connected to a ground. The resistors banks (groups of 12 resistors) are connected in series. Each individual resistor in the bank is activated/deactivated by the bi-lateral switch to cumulatively approximate the representative resistance for each of the four corners.

FIG. 8 is a schematic of the S-cap emulator load controller and load control circuit. Also, FIG. 8 illustrates a plurality of resistor banks, a port expander and an on/off switch for each of four resistor banks.

In operation, the final function of the disclosed invention will be identical to what the end user experienced with the surface capacitive controller which is a single reported touch location as displayed on a Liquid Crystal Display (LCD) or a Cathode Ray Tube (CRT) such as a computer monitor, a television, a screen or other equivalent apparatus.

The invention may be applied to 5-wire analog resistive touch systems. In this case, the microcontroller on the emulation board would comprise a new setting of two output voltages, an X voltage and a Y voltage, as typically found in an analog resistive system. A resistive control board would then interpret the two output voltages and report a final touch position to the host computer. Again, in regulated or tightly controlled environments, such as in the medical environment, where resistive technology is prevalent, this P-Cap replacement kit/system would increase the durability of the end system while keeping the controlled electronics untouched.

There are many benefits to projected capacitive touch technology as compared to surface capacitive technology including:

1) Electrical coating layer (typically indium tin oxide) is located behind (i.e. underneath) a glass touch surface. Any surface damage to a surface layer does not damage the indium tin oxide (ITO) layer and therefore does not have a negative impact on the reported touch location.

2) Projected capacitive touch sensors are typically laminated constructions allowing for greater physical durability as compared to a monolithic surface capacitive construction.

3) Projected capacitive technology has become the de facto standard for the consumer electronics industry and common components are readily available.

4) Calibration is not needed.

Furthermore, there are a plurality of advantages of the invention over the prior existing technology. For example, the durability of the end solution such as the electrical coatings cannot be easily damaged, and the structure of the coatings is typically two pieces of laminated material giving greater physical durability. Also, the projected capacitive technology has longevity as by the de facto standard in consumer electronics, common components for P-Cap systems are readily available and as global volume for S-Cap and P-Cap manufacturing diminishes, replacement sensors become more difficult and more expensive to find. Moreover, this invention allows for a migration to state-of-the-art touch sensing while utilizing existing touch controller electronics that are tightly regulated in end use.

Finally, it should be noted that the above embodiments are only used to illustrate the technical aspects of the present disclosure, rather than limit the embodiments. Although the present disclosure has been described in detail with reference to the foregoing embodiments, it should be understood by a person of ordinary skill in the art that the technical aspects described in the embodiments can still be modified or equivalent substitutions can be made to some or all of the technical features and the modifications or substitutions would not change the substance of the scope of the embodiments of the present disclosure.

What is claimed is:

1. A projected capacitive to surface capacitive interface device comprising:
    a projected capacitive touch controller connected to a projected capacitive touch sensor;
    a connector wire between the projected capacitive touch controller and an emulation board;
    a microcontroller connected to the emulation board;
    a surface capacitive touch controller connected to the emulation board; and
    a connector connecting the surface capacitive touch controller to a host computer.

2. The device according to claim 1, wherein the projected capacitive touch controller is connected to the projected capacitive touch sensor with a chip on flex circuit.

3. The device according to claim 1, wherein the projected capacitive touch controller is connected to the projected capacitive touch sensor with a discrete chip on board controller.

4. The device according to claim 1, wherein the connector wire coordinates an interface between the projected capacitive touch controller and the emulation board.

5. The device according to claim 4, wherein the interface also includes an Inter-Integrated Circuit (I2C) and a Universal Serial Bus (USB).

6. The device according to claim 1, wherein the emulation board comprises a plurality of potentiometers and an equivalent interface circuit.

7. The device according to claim 1, wherein the microcontroller is located on or integrated into the emulation board and the microcontroller converts calculated projected capacitive touch coordinates from the projected capacitive touch sensor to resistance values.

8. The device according to claim 7, wherein a pin connector wire is positioned between the emulation board and the surface capacitive touch controller.

9. The device interface according to claim 7, wherein the emulation board further comprises a plurality of potentiometers.

10. The device according to claim 9, wherein there are four potentiometers and three of the four potentiometers are set to equivalent surface capacitive resistances.

11. The device according to claim 10, wherein the microcontroller converts touch coordinates from the projected capacitive touch sensor to the equivalent surface capacitive resistances.

12. The device according to claim 9, wherein the microcontroller sets potentiometer values by an Inter-Integrated Circuit (I2C).

13. The device according to claim 7, wherein the microcontroller further sends the resistance values to the surface capacitive touch controller.

14. The device according to claim 13, wherein the surface capacitive controller calculates a calculated touch coordinate using the resistance values and sends a final touch position to the host computer.

15. The device according to claim 1, the surface capacitive touch controller comprises a plurality of amplifiers being connected to a voltage source and a ground is connected between the emulation board and the surface capacitive touch controller.

16. The device according to claim 15, wherein voltage is applied to the projected capacitive touch controller and the emulation board and the voltage comes from the host computer.

17. The device according to claim 15, wherein voltage is applied to the projected capacitive touch controller and the emulation board and the voltage comes from the surface capacitive touch controller.

18. The device to claim 15, wherein the ground is connected to an equivalent interface circuit of the emulation board.

19. The device according to claim 1, wherein the projected capacitive touch sensor comprises a top touch surface, an anti-glare coating positioned underneath and adjacent the top touch surface, a first soda-lime glass layer positioned underneath and adjacent the anti-glare coating, an index matched optically clear adhesive positioned underneath the first soda-lime glass layer, an indium tin oxide (ITO) coating positioned underneath and adjacent the index matched optically clear adhesive and a second soda-lime glass layer positioned underneath and adjacent the indium tin oxide (ITO) coating.

20. The device according to claim 19, further comprising an additional indium tin oxide (ITO) coating positioned underneath and adjacent the first soda-lime glass layer.

* * * * *